(12) United States Patent
Shelnutt et al.

(10) Patent No.: US 9,690,339 B2
(45) Date of Patent: Jun. 27, 2017

(54) SYSTEMS AND METHODS FOR PROVIDING USER-VISIBLE THERMAL PERFORMANCE DEGRADATION MONITORING IN AN INFORMATION HANDLING SYSTEM

(71) Applicant: Dell Products L.P., Round Rock, TX (US)

(72) Inventors: Austin Michael Shelnutt, Leander, TX (US); Christopher M. Helberg, Austin, TX (US); Travis C. North, Cedar Park, TX (US)

(73) Assignee: Dell Products L.P., Round Rock, TX (US)

( * ) Notice: Subject to any disclaimer, the term of this patent is extended or adjusted under 35 U.S.C. 154(b) by 417 days.

(21) Appl. No.: 14/190,563

(22) Filed: Feb. 26, 2014

(65) Prior Publication Data
US 2015/0241885 A1  Aug. 27, 2015

(51) Int. Cl.
*G05D 23/00* (2006.01)
*G06F 1/20* (2006.01)

(52) U.S. Cl.
CPC .................. *G06F 1/206* (2013.01)

(58) Field of Classification Search
CPC ........................................................ G06F 1/20
See application file for complete search history.

(56) References Cited

U.S. PATENT DOCUMENTS

| | | | | |
|---|---|---|---|---|
| 2009/0268404 A1* | 10/2009 | Chu | .................... | H05K 7/20836 361/696 |
| 2009/0295648 A1* | 12/2009 | Dorsey | ................ | H01Q 1/2266 343/702 |
| 2010/0193336 A1* | 8/2010 | Walton | .................... | F21V 21/36 200/61.52 |
| 2013/0015799 A1* | 1/2013 | Ayano | .................... | B60L 3/003 318/430 |
| 2013/0128918 A1* | 5/2013 | Campbell | .......... | H05K 7/20836 374/57 |
| 2013/0343668 A1* | 12/2013 | Li | ............................. | G06T 9/00 382/244 |
| 2015/0003492 A1* | 1/2015 | Miyanagi | ........... | G01R 31/2619 374/44 |

FOREIGN PATENT DOCUMENTS

JP         10053016 A    *  2/1998

* cited by examiner

*Primary Examiner* — Philip Wang
(74) *Attorney, Agent, or Firm* — Jackson Walker L.L.P.

(57) ABSTRACT

In accordance with embodiments of the present disclosure, an information handling system may include a processor, a user interface communicatively coupled to the processor, and a thermal management application. The thermal management application may include a program of instructions embodied in non-transitory computer-readable media, and may be configured to, when executed by the processor receive measurements associated with a plurality of parameters of a thermal system of the information handling system, calculate a calculated thermal resistance based on the measurements, and report information regarding the calculated thermal resistance via the user interface.

18 Claims, 3 Drawing Sheets

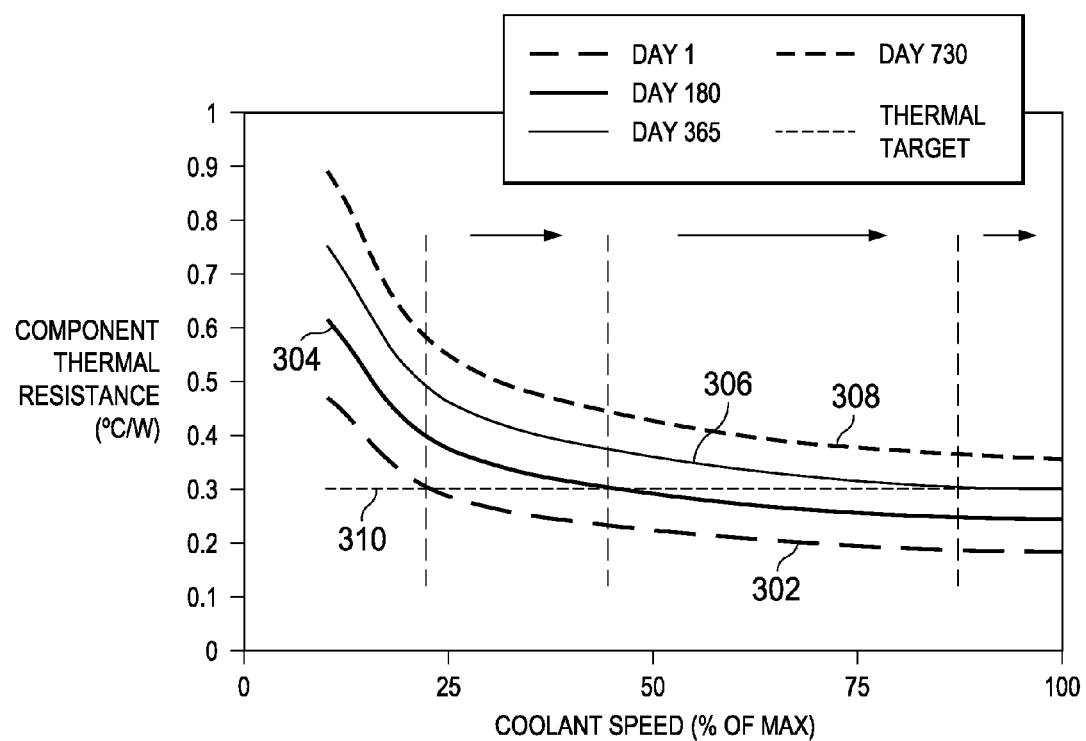

SYSTEMS AND METHODS FOR PROVIDING USER-VISIBLE THERMAL PERFORMANCE DEGRADATION MONITORING IN AN INFORMATION HANDLING SYSTEM

TECHNICAL FIELD

The present disclosure relates in general to information handling systems, and more particularly to providing user-visible thermal performance degradation monitoring in an information handling system, including reporting thermal performance degradation to a user during runtime of an operating system executing on the information handling system.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

As processors, graphics cards, random access memory (RAM) and other components in information handling systems have increased in clock speed and power consumption, the amount of heat produced by such components as a side-effect of normal operation has also increased. Often, the temperatures of these components need to be kept within a reasonable range to prevent overheating, instability, malfunction and damage leading to a shortened component lifespan. Accordingly, cooling systems (e.g., cooling fans, blowers, liquid pumps, jets, free convection enclosures, etc.) have often been used in information handling systems to cool information handling systems and their components.

During the lifetime of an information handling system, entrainment of particulates (e.g., dust) into the information handling system may lead to fouling of cooling surfaces (e.g., heatsinks) within an information handling system, increased coolant flow impedance, reduce heat transfer from information handling system components, and significantly degrade the ability of cooling systems to cool information handling system components. Over time, this fouling can result in significantly increased speeds of coolant driven by a cooling system (e.g., increase in air mover speeds), component throttling, and/or reduced ambient support, all of which negatively impact customer experience. While particulate build up and fouling often go unnoticed by customers, increased noise caused by increased cooling system speeds (e.g., fan speeds) and degradation in information handling system performance is often noticed by consumers.

SUMMARY

In accordance with the teachings of the present disclosure, the disadvantages and problems associated with user experience as it relates to thermal performance degradation in an information handling system may be reduced or eliminated.

In accordance with embodiments of the present disclosure, an information handling system may include a processor, a user interface communicatively coupled to the processor, and a thermal management application. The thermal management application may include a program of instructions embodied in non-transitory computer-readable media, and may be configured to, when executed by the processor receive measurements associated with a plurality of parameters of a thermal system of the information handling system, calculate a calculated thermal resistance based on the measurements, and report information regarding the calculated thermal resistance via the user interface.

In accordance with these and other embodiments of the present disclosure, a method may include receiving measurements associated with a plurality of parameters of a thermal system of an information handling system. The method may also include calculating a calculated thermal resistance based on the measurements. The method may further include reporting information regarding the calculated thermal resistance via a user interface of the information handling system.

In accordance with these and other embodiments of the present disclosure, an article of manufacture may include a non-transitory computer readable medium and computer-executable instructions carried on the computer readable medium. The instructions may be readable by a processor, the instructions, when read and executed, for causing the processor to: receive measurements associated with a plurality of parameters of a thermal system of an information handling system, calculate a calculated thermal resistance based on the measurements, and report information regarding the calculated thermal resistance via a user interface of the information handling system.

Technical advantages of the present disclosure will be apparent to those of ordinary skill in the art in view of the following specification, claims, and drawings.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein:

FIG. 3 illustrates example curves of thermal resistance versus coolant speed over a lifetime of an information handling system, in accordance with certain embodiments of the present disclosure.

DETAILED DESCRIPTION

Figure 1:
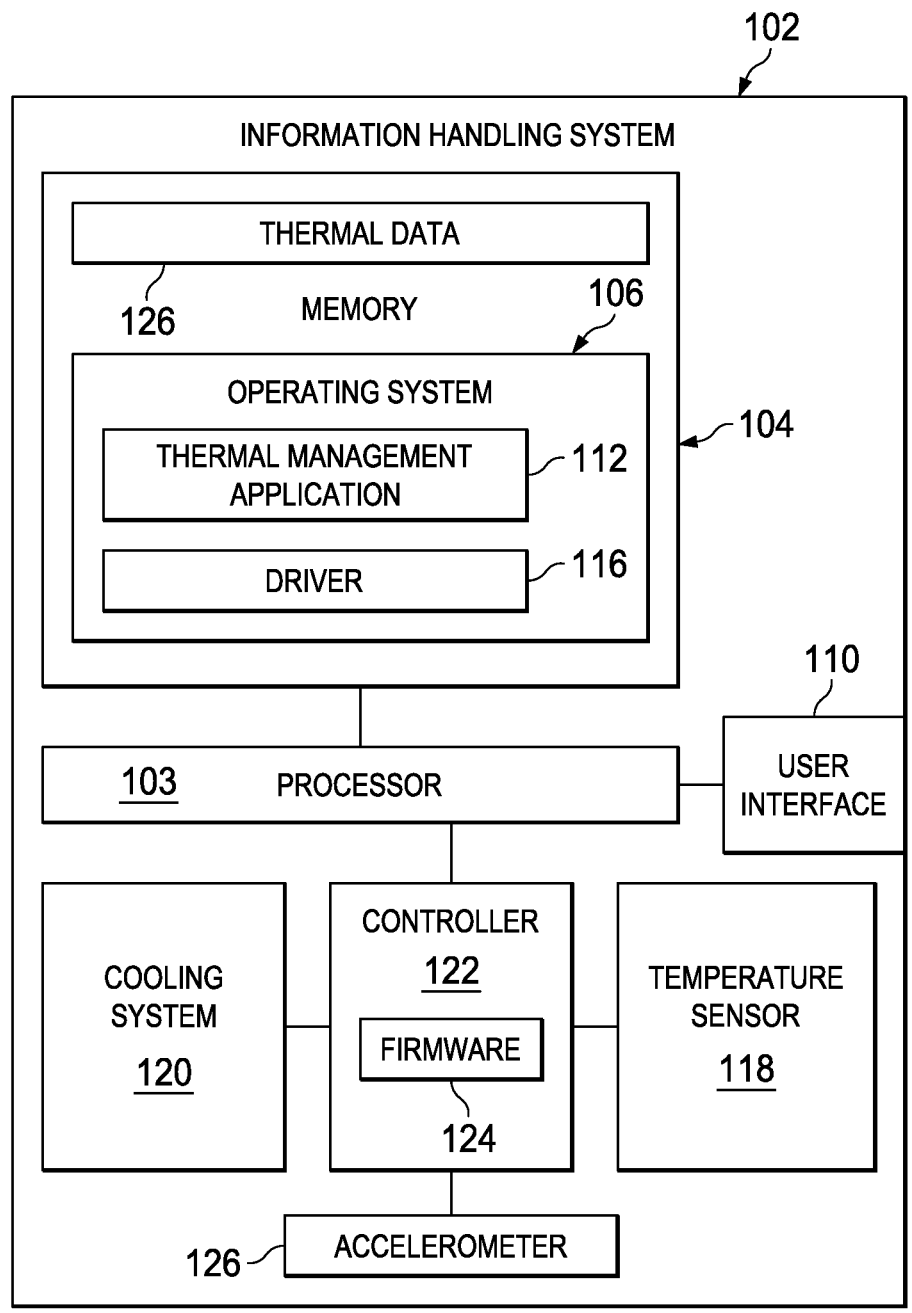
FIG. 1 illustrates a block diagram of an example information handling system including functionality for providing user-visible thermal performance degradation monitoring, in accordance with certain embodiments of the present disclosure.
Figure 2:
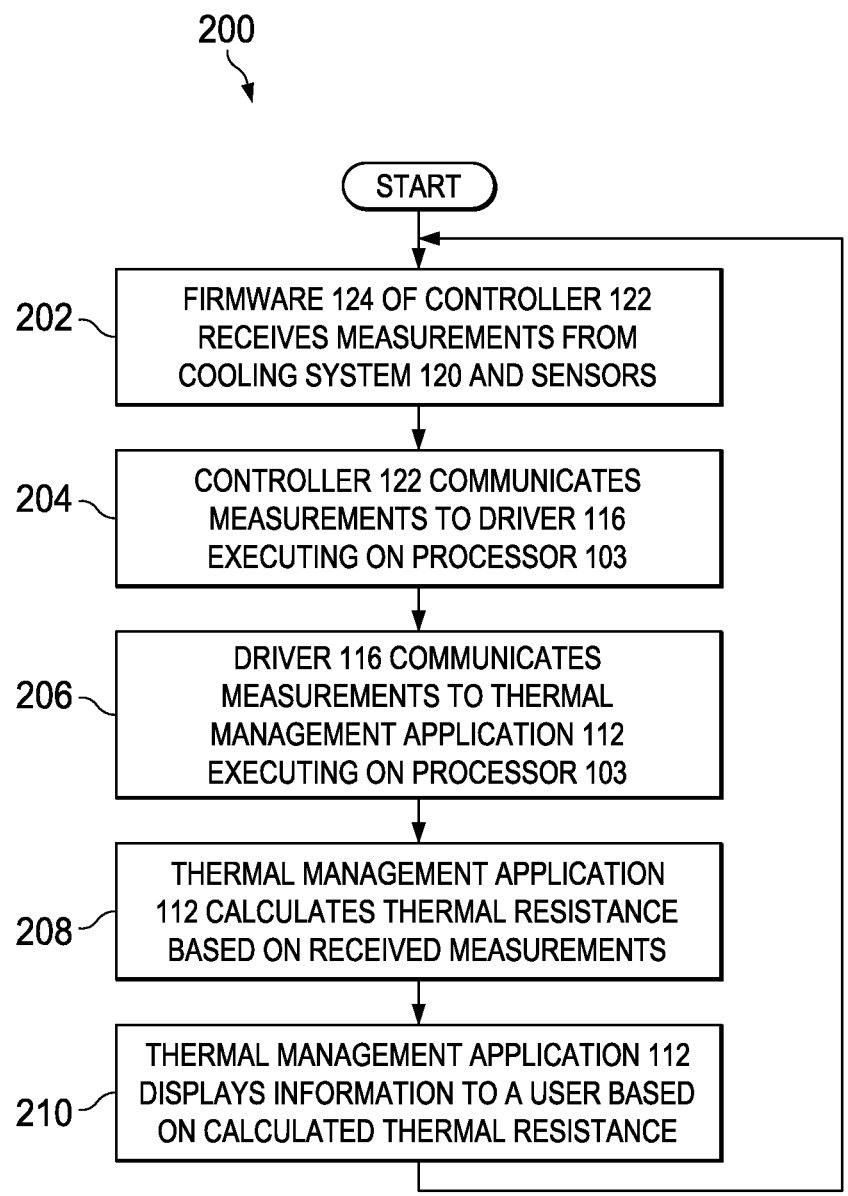
FIG. 2 illustrates a flow chart of an example method for providing user-visible thermal performance degradation monitoring, in accordance with certain embodiments of the present disclosure.

Preferred embodiments and their advantages are best understood by reference to FIGS. 1-3, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems (BIOSs), buses, memories, I/O devices and/or interfaces, storage resources, network interfaces, motherboards, and/or any other components and/or elements of an information handling system.

FIG. 1 illustrates a block diagram of an example information handling system 102 including functionality for providing user-visible thermal performance degradation monitoring. In some embodiments, information handling system 102 may comprise a server. In other embodiments, information handling system 102 may be a personal computer (e.g., a desktop computer, a laptop, notebook, tablet, handheld, smart phone, personal digital assistant, etc.). As depicted in FIG. 1, information handling system 102 may include a processor 103, a memory 104 communicatively coupled to processor 103, a user interface 110 communicatively coupled to processor 103, a controller 122 communicatively coupled to processor 103, a cooling system 120 communicatively coupled to controller 122, one or more temperature sensors 118 coupled to controller 122, and one or more accelerometers coupled to controller 122.

Processor 103 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104 and/or another component of information handling system 102.

Memory 104 may be communicatively coupled to processor 103 and may include any system, device, or apparatus configured to retain program instructions and/or data for a period of time (e.g., computer-readable media). Memory 104 may include RAM, EEPROM, a PCMCIA card, flash memory, magnetic storage, opto-magnetic storage, or any suitable selection and/or array of volatile or non-volatile memory that retains data after power to information handling system 102 is turned off.

As shown in FIG. 1, memory 104 may have operating system 106 stored thereon. Operating system 106 may be any program of executable instructions, or aggregation of programs of executable instructions, configured to manage and/or control the allocation and usage of hardware resources (e.g., processor 103, memory 104, user interface 110, and/or other information handling resources) and provide an interface between such hardware resources and application programs hosted by operating system 106, and thus may act as a host for application programs to be executed by information handling system 102. Active portions of operating system 106 may be read and executed by processor 103 in order to carry out the functionality of operating system 106. Examples of operating system 106 may include, without limitation, Windows, MacOS, UNIX, LINUX, Android, iOS, or any other closed or open source operating system.

As depicted in FIG. 1, operating system 106 may include a thermal management application 112 and a driver 116. Thermal management application 112 may comprise any program of instructions configured to, when read and executed by processor 103, facilitate communication (e.g., via user interface 110) of information (e.g., notifications, alerts, messages, prompts) to a user of information handling system 102 regarding thermal conditions of information handling system 102, as described in greater detail below. For example, thermal management application 112 may comprise and/or may have functionality similar to that of OpenManage Client Instrumentation (OMCI), which is available from Dell Inc. In operation, thermal management application 112 may, when read and executed by processor 103, communicate with driver 116 to receive thermal information. Although thermal management application 112 is depicted in FIG. 1 as being part of or being capable of executing upon an operating system 106, it is noted thermal application 112 may reside in and/or execute upon any suitable component of information handling system (e.g., a basic input/output system of information handling system 102, pre-boot diagnostic utility of information handling system 102, etc.)

Driver 116 may comprise a program of instructions configured to, when read and executed by processor 103, provide an interface between operating system 106 and firmware 124 executing on controller 122. As described in greater detail below, driver 116 may receive information regarding thermal conditions of information handling system 102 from firmware 124, and further communicate such information (e.g., in the form of notifications, alerts, messages, and/or prompts to user interface 110) to thermal management application 112, thus permitting operating-system runtime reporting of thermal information to a user. In some embodiments, driver 116 may comprise an Intelligent Platform Management Interface (IPMI) driver.

As shown in FIG. 1, memory 106 may also have stored thereon thermal data 126. As described in greater detail below, thermal data 126 may include any suitable information regarding thermal characteristics of information handling resources of information handling system 102. For example, in some embodiments, thermal data 126 may include information indicative of an ideal thermal resistance (as such term is defined below) at various speeds of a mover of coolant (e.g., air, liquid, etc.), which may represent an approximate desired thermal resistance in the presence of little or no thermal degradation of information handling system 102.

User interface 110 may comprise any instrumentality or aggregation of instrumentalities by which a user may interact with information handling system 102. For example, user interface 110 may permit a user to input data and/or instructions into information handling system 102, and/or otherwise manipulate information handling system 102 and its associated components. User interface 110 may also permit information handling system 102 to communicate data to a user, e.g., by way of a display device.

Cooling system 120 may be communicatively coupled to controller 122, and may include any mechanical or electro-mechanical system, apparatus, or device operable to move coolant (e.g., air, other gasses, liquids) throughout a chassis or enclosure of information handling system 102. In some embodiments, cooling system 120 may comprise a fan (e.g., a rotating arrangement of vanes or blades which act on a gaseous coolant such as air). In other embodiments, cooling system 120 may comprise a blower (e.g., a centrifugal fan that employs rotating impellers to accelerate gaseous cooling received at its intake and change the direction of the airflow). In operation, in the case of a cooling system 120 including an air mover (e.g., fan or blower), the air mover may cool information handling resources of information handling system 102 by drawing cool air into an enclosure housing the information handling resources from the outside of the housing, expel warm air from inside the enclosure to the outside of such enclosure, and/or move air across one or more heatsinks (not explicitly shown) internal to the enclosure to cool one or more information handling resources.

In other embodiments, cooling system 120 may comprise mechanisms other than a blower for moving coolant, including liquid pumps, jets, and/or free convection enclosures.

In these and other embodiments, rotating and other components for moving coolant by cooling system 120 may be driven by a motor or other mechanical device. The rotational speed of such motor may be controlled by suitable control signals communicated from a controller 122 of cooling system 120. Controller 122 may comprise any system, device, or apparatus configured to, under the direction of firmware 124 executing thereon, control a coolant flow delivered by cooling system 120 based on appropriate control signals received from temperature sensor 118. In these and other embodiments, controller 122 may also be configured to, under direction of firmware 124, communicate thermal information receive from temperature sensor 118 to driver 116 (e.g., via IPMI).

Temperature sensor 118 may be any system, device, or apparatus (e.g., a thermometer, thermistor, etc.) configured to communicate a signal to controller 122 indicative of a temperature within information handling system 102. In many embodiments, information handling system 102 may comprise a plurality of temperature sensors 118, wherein each temperature sensor 118 detects a temperature of a particular component and/or location within information handling system 102. For example, one temperature sensor 118 may detect an ambient temperature of coolant entering information handling system 102 via a cooling system 120 while another temperature sensor 118 may detect a temperature of processor 103.

Accelerometer 126 may be communicatively coupled to controller 122, and may include any system, device, or apparatus configured to measure acceleration (e.g., proper acceleration) experienced by information handling system 102. Accordingly, accelerometer 126 may measure a gravitational orientation of information handling system 102.

In addition to processor 103, memory 104, user interface 110, cooling system 120, controller 122, temperature sensor 118, and accelerometer 126, information handling system 102 may include one or more other information handling resources.

In operation, controller 122 may receive measurements indicative of thermal performance of cooling system 120. For example, such measurements may include a speed of coolant driven by the cooling system (e.g., air flow generated by air mover, liquid flow generated by liquid pump or jet, flow of coolant in a free-convection system, etc.), an ambient temperature associated with information handling system 102 (e.g., a temperature measured by a temperature sensor 118 at an coolant intake inlet of cooing system 120), a temperature associated with one or more information handling resources of information handling system 102 (e.g., a temperature measured by a temperature sensor 118 proximate to processor 103 and/or other heat-dissipating information handling resource), and/or a gravitational orientation of information handling system 102 as measured by accelerometer 126. Controller 122 may in turn communicate such measurements to thermal management application 112 via driver 116. As described in greater detail below, thermal management application 112 may, based on such parameters, quantify thermal degradation. For example, based on these parameters, thermal management application 112 may calculate a thermal resistance (e.g., $R=(T_{comp}-T_{amb})/P_{comp}$, where $T_{comp}$ is a temperature proximate to a given component internal to information handling system 102, $T_{amb}$ is an ambient temperature associated with information handling system 102 (e.g., temperature of coolant present at intake of cooling system 120), $P_{comp}$ is the power consumption of the given component, wherein R is a function of the speed of coolant flow, component power dissipation, component temperature, and/or gravitational orientation). If such calculated thermal resistance exceeds a threshold value, then thermal management application 112 may generate an alert to user interface 110, which may prompt a user to take action in response to the thermal degradation (e.g., clean inlet vents for coolant, clean dust from heat sinks, clean/replace filters, and/or identify failures in the thermal system).

FIG. 2 illustrates a flow chart of an example method 200 for providing user-visible thermal performance degradation monitoring, in accordance with certain embodiments of the present disclosure. According to some embodiments, method 200 may begin at step 202. As noted above, teachings of the present disclosure may be implemented in a variety of configurations of information handling system 102.

At step 202, firmware 124 of controller 122 may receive measurements from cooling system 120 and one or more sensors of information handling system 102 (e.g., temperature sensor 118 and/or accelerometer 126). For example, controller 122 may receive from cooling system 120 a measurement of the speed of the flow of the coolant, may receive from temperature sensors 118 measurements of a plurality of temperatures of information handling system 102 (e.g., one or more ambient temperatures associated with information handling system 102, temperatures proximate to one or more information handling resources of information handling system 102, power consumed by processor 103 or other information handling resources, etc.), and may receive from accelerometer 126 measurements of a gravitational orientation of information handling system 102.

At step 204, controller 122 may communicate such measurements to driver 116 executing on processor 103 which may in turn, at step 206, communicate such measurements to thermal management application 112 executing on processor 103.

At step 208, thermal management application 112 may calculate a thermal resistance based on received measurements. For example, such thermal resistance may be calculated as the difference between a temperature of a given information handling resource (e.g., processor 103) and an ambient temperature associated with information handling system 102, divided by a power consumed by the given information handling resource.

To further illustrate the concept of thermal resistance, reference is made to FIG. 3, which illustrates example curves of thermal resistance versus coolant speed over a lifetime of an information handling system, in accordance with certain embodiments of the present disclosure. For example, in an ideal scenario (e.g., before thermal degradation of a thermal system due to fouling) thermal resistance versus coolant speed of a thermal system may be characterized by curve 302. In some embodiments, information stored in thermal data 126 may be indicative of such ideal curve 302. However, over time, fouling may cause degradation of the thermal system, and thermal resistance may generally increase over such time for all coolant speeds, as shown by curves 304, 306, and 308. As thermal resistance versus coolant speed for a thermal system increases, cooling system 120 must employ increasing speed in order to meet a target thermal resistance 310 for adequately cooling an information handling resource. If sufficient degradation occurs, the thermal performance of the thermal system may reach a point at which no speed of coolant from cooling system 120 will provide adequate thermal performance (see, e.g., curve 308), which may lead to overheating of information handling resources and throttling of information handling resources in order to reduce their heat generation.

At step 210, thermal management application 112 may display information to a user (e.g., via user interface 110) based on the calculated thermal resistance. For example, in some embodiments, such information may include the value of the thermal resistance.

As another example, in these and other embodiments, such information may include an alert. To illustrate, thermal management application 112 may compare the calculated thermal resistance to an ideal thermal resistance for the particular speed of the coolant at which the calculated thermal resistance was determined. In some embodiments, such ideal thermal resistance for the particular speed of the coolant may be retrieved from thermal data 126. If the calculated thermal resistance is more than a predetermined factor (e.g., 1.5, 2) of the ideal thermal resistance at the relevant speed of the coolant, such a condition may indicate degraded thermal performance of cooling system 120. Accordingly, in response to the calculated thermal resistance exceeding the ideal thermal resistance by the predetermined factor, thermal management application 112 may display an alert to a user (e.g., via user interface 110). In some embodiments, such alert may include a prompt to an end user or administrator of information handling system 102 to take an action in response to the alert, including without limitation a prompt to clean intake vents of the housing of information handling system 102, clean dust from cooling surfaces of information handling system 102, and/or clean or change one or more filters of information handling system 102 and/or cooling system 120. After completion of step 210, method 200 may proceed again to step 202.

In some embodiments, a method identical or similar to method 200 may be employed in a factory setting in which information handling system 102 is manufactured, such that a factory technician and/or a factory automation may ensure that thermal performance is within a satisfactory tolerance of ideal performance prior to information handling system 102 being shipped to a customer. Operation outside of such satisfactory tolerance may indicate a defect in components of a thermal system (e.g., an improperly attached heat sink, unintended blockage of coolant, etc.).

Although FIG. 2 discloses a particular number of steps to be taken with respect to method 200, method 200 may be executed with greater or lesser steps than those depicted in FIG. 2. In addition, although FIG. 2 discloses a certain order of steps to be taken with respect to method 200, the steps comprising method 200 may be completed in any suitable order.

Method 200 may be implemented using information handling system 102 or any other system operable to implement method 200. In certain embodiments, method 200 may be implemented partially or fully in software and/or firmware embodied in computer-readable media.

This disclosure encompasses all changes, substitutions, variations, alterations, and modifications to the exemplary embodiments herein that a person having ordinary skill in the art would comprehend. Similarly, where appropriate, the appended claims encompass all changes, substitutions, variations, alterations, and modifications to the exemplary embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

All examples and conditional language recited herein are intended for pedagogical objects to aid the reader in understanding the invention and the concepts contributed by the inventor to furthering the art, and are construed as being without limitation to such specifically recited examples and conditions. Although embodiments of the present inventions have been described in detail, it should be understood that various changes, substitutions, and alterations could be made hereto without departing from the spirit and scope of the disclosure.

What is claimed is:

1. An information handling system comprising:
a processor;
a user interface communicatively coupled to the processor;
a cooling system for driving a coolant; and
a non-transitory computer-readable medium including:

thermal data indicative of a thermal characteristic of an information handling resource of the information handling system; and a thermal management application comprising a program of instructions configured, when executed by the processor, to perform operations comprising:

receiving measurements for a plurality of parameters of a thermal system of the information handling system, wherein the plurality of parameters includes a speed parameter indicative of a speed of the coolant;

calculating a calculated thermal resistance based on at least some of the measurements;

determining, based on the thermal data, an ideal resistance corresponding to the speed of the coolant; and generating an alert responsive to detecting an actual ratio of the calculated thermal resistance to the ideal resistance exceeding a particular ratio.

2. The information handling system of claim 1, wherein the thermal data includes ideal curve data indicative of the ideal resistance for various values of the speed parameter.

3. The information handling system of claim 1, wherein:
the plurality of parameters include an ambient temperature, a component temperature indicative of a temperature of the information handling resource, and a power parameter indicative of power provided to the information handling resource; and
calculating the calculated thermal resistance comprises dividing a temperature delta, indicative of a difference between the component temperature and the ambient temperature, by the power generated.

4. The information handling system of claim 1, wherein the threshold thermal resistance is a multiplicative factor of an ideal thermal resistance at a speed of the coolant at which the calculated thermal resistance is calculated.

5. The information handling system of claim 1, wherein the plurality of parameters includes a power parameter indicative of power consumed by an information handling resource of the information handling system.

6. The information handling system of claim 1, further comprising at least one temperature sensor, and wherein the plurality of parameters includes a temperature measured by the at least one temperature sensor.

7. The information handling system of claim 1, wherein further comprising at least one accelerometer, and wherein the plurality of parameters includes a gravitational orientation measured by the at least one accelerometer.

8. The information handling system of claim 1, wherein the plurality of parameters includes a power dissipation associated with an information handling resource of the information handling system.

9. An article of manufacture comprising:
a non-transitory computer readable medium; and
computer-executable instructions carried on the computer readable medium, the instructions readable by a processor, the instructions, when read and executed, for causing the processor to perform operations comprising:

receiving measurements for a plurality of parameters of a thermal system of an information handling system, wherein the plurality of parameters includes a speed parameter indicative of a speed of a coolant driven by a cooling system integral to the information handling system;

calculating a calculated thermal resistance based on at least some of the measurements;

determining, based on thermal data indicative of a thermal characteristic of an information handling resource of the information handling system, an ideal resistance corresponding to the speed of the coolant; and generating an alert responsive to detecting an actual ratio of the calculated thermal resistance to the ideal resistance exceeding a particular ratio.

10. The article of claim 9, wherein:
the plurality of parameters include an ambient temperature, a component temperature indicative of a temperature of the information handling resource, and a power parameter indicative of power provided to the information handling resource; and
calculating the calculated thermal resistance comprises dividing a temperature delta, indicative of a difference between the component temperature and the ambient temperature, by the power generated.

11. A method comprising:
receiving measurements for a plurality of parameters of a thermal system of an information handling system, wherein the plurality of parameters includes a speed parameter indicative of a speed of a coolant driven by a cooling system integral to the information handling system;
calculating a calculated thermal resistance based on at least some of the measurements;
determining, based on thermal data indicative of a thermal characteristic of an information handling resource of the information handling system, an ideal resistance corresponding to the speed of the coolant; and
generating an alert responsive to detecting an actual ratio of the calculated thermal resistance to the ideal resistance exceeding a particular ratio.

12. The method of claim 11, wherein
the thermal data includes data indicative of ideal resistance values for a plurality of values of the speed parameter.

13. The method of claim 11, wherein:
the plurality of parameters include an ambient temperature, a component temperature indicative of a temperature of the information handling resource, and a power parameter indicative of power provided to the information handling resource; and
calculating the calculated thermal resistance comprises dividing a temperature delta, indicative of a difference between the component temperature and the ambient temperature, by the power generated.

14. The method of claim 11, wherein the threshold thermal resistance is a multiplicative factor of an ideal thermal resistance at a speed of the coolant at which the calculated thermal resistance is calculated.

15. The method of claim 11, wherein the plurality of parameters includes a power parameter indicative of power consumed by an information handling resource of the information handling system.

16. The method of claim 11, further comprising at least one temperature sensor, and wherein the plurality of parameters includes a temperature measured by the at least one temperature sensor.

17. The method of claim 11, wherein further comprising at least one accelerometer, and wherein the plurality of parameters includes a gravitational orientation measured by the at least one accelerometer.

18. The method of claim 11, wherein the plurality of parameters includes a power dissipation associated with an information handling resource of the information handling system.

\* \* \* \* \*